April 14, 1964     M. B. HESSLEIN     3,128,905
WIRE HANDLE FOR A MOLDED CONTAINER
Filed Nov. 16, 1961
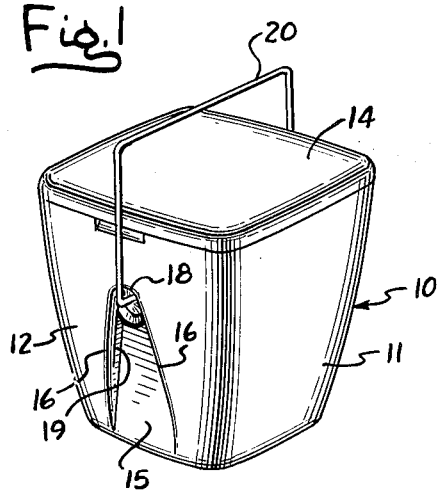
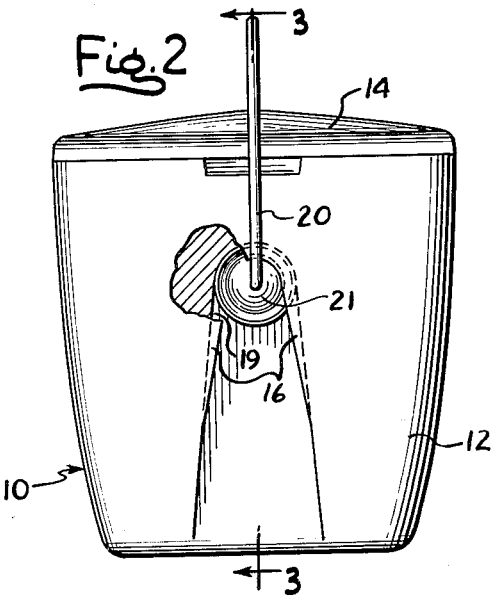
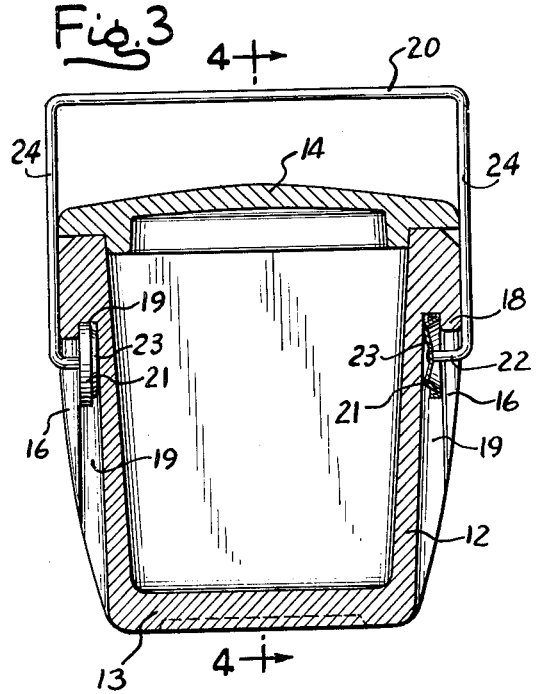
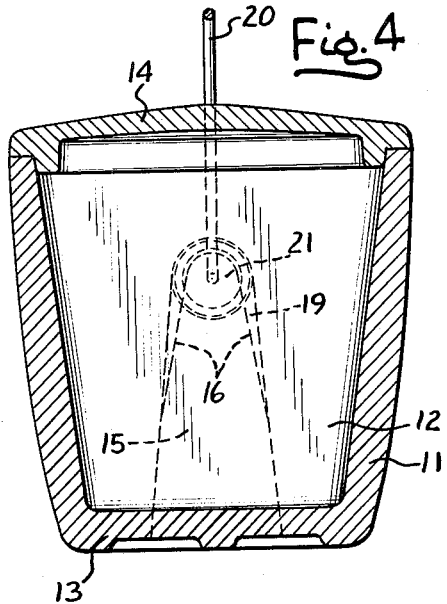
INVENTOR.
MILTON B. HESSLEIN
BY Gary, Desmond & Parker
ATTYS.

United States Patent Office 3,128,905
Patented Apr. 14, 1964

3,128,905
WIRE HANDLE FOR A MOLDED CONTAINER
Milton B. Hesslein, Highland Park, Ill., assignor to Arvey Corporation, Chicago, Ill., a corporation of Delaware
Filed Nov. 16, 1961, Ser. No. 152,724
1 Claim. (Cl. 220—95)

This invention relates to a novel receptacle.

More particularly, the present invention relates to a receptacle formed of a molded composition and preferably one which has insulating properties, making it suitable for such use as an ice bucket.

The present invention further relates to a receptacle molded with grooves in the defining side wall or walls thereof adapted for separable engagement with a bail therefor.

It is a particular object of the present invention to provide a receptacle of the class described molded with means whereby a bail may be securely engaged thereto even though the receptacle body is of a relatively soft and cellular readily deformable character.

It is a further object of the present invention to provide a disposable receptacle body of the character described adapted for engagement with a reusable separable bail.

Other objects and advantages of the present invention, its details of construction, arrangement of parts, and the economies thereof will be apparent from a consideration of the following specification and accompanying drawings, wherein:

FIG. 1 is a perspective view of the receptacle and associated bail of the present invention.

FIG. 2 is a side elevational view, with parts broken away, of the device of the present invention.

FIG. 3 is a section on the line 3—3 of FIG. 2.

FIG. 4 is a section on the line 4—4 of FIG. 3.

Referring to the drawings, the reference numeral 10 generally indicates a receptacle having an opposed pair of side walls 11, 11, and a second pair of opposed side walls 12, 12. Although the receptacle 10 is generally rectangular in transverse section, it will be understood that if desired it can be of other shape, such as hexagonal or circular.

As shown, the receptacle 10 has an integral bottom 13, is open at the top and can be closed by the separable cover 14 which here seats on the upper edge or lip of the side walls.

The receptacle 10 of the present invention is suitably composed of a lightweight cellular insulating composition body so that it is suitable for holding ice or for protecting foods, either hot or cold, against heat transfer for appreciable periods. To this end the body 10 can be composed of felted fibers, i.e., waste paper pulp or other fibers either alone or in combination with a binder. Particularly suitable are the lightweight, rigid, cellular synthetic resin compositions which can be molded to shape from shreds or preformed small cellular particles, foamed-in-place in a suitable mold by presently well known techniques. Suitable known resins used in this manner are polyurethane rigid foams, cellulose acetate foams, foamed liquid phenolic resins, shredded urea formaldehyde resins, cellular polystyrene beads, polyvinyl chloride foams, and the like.

As shown in the drawings, the sides 12, 12 are each formed with an indentation or vertical slotted area 15 which opens outwardly and toward the bottom 13. The defining side edges 16, 16 of the slotted area 15 converge toward each other and toward the upper terminal end 17 of the slot or indentation 15, whereat the upper define of the slot is suitably arcuate as at 18.

This upper arcuate end portion 18 and the adjacent side edge portions 16, 16 are, in accordance with the preferred and illustrated embodiment of the present invention, formed with an undercut groove 19 leaving an overhanging lip portion thereat and forming a pocket beneath said lip. This upper grooved area of the depression 15 is preferably of gradually increasing greater thickness in an upward direction, as shown, so that the remaining thickness of the side walls 12 is substantially uniform, the bottoms of the indentations are flat and substantially parallel to each other, and the structural and insulating qualities of the walls unimpaired.

The aforesaid depressed area 15 and its defining side and upper portions are shaped to receive and anchor a separable handle or bail 20 including a bight and legs 24 adapted to closely engage the upper side walls of the receptacle by means of its associated anchor plates or discs 21, the diameter of the discs 21 conforming to the curvature of the undercut groove 19. The discs 21 each of which includes on its inner face a concaved yieldable portion or element 23, as seen in section on the right-hand side of FIG. 3 are pivotally retained and secured to the inwardly extending bail end portions 22.

The bail 20 can be engaged to the receptacle 10 by first disposing the discs 21 within the lower relatively large and open portions of the indentations 15, and then the discs are drawn upwardly so that they become seated and wedged in the upper portions of these indentations and within the previously described pockets. Although the discs 21 become suitably wedged in frictional engagement within the indicated pockets and provide a means whereby the receptacle may be securely carried, it will be understood as previously indicated that the bail can be readily separated from the receptacle when, for example, it is desired to dispose of the receptacle or otherwise retain the bail for reuse.

Although I have shown and described the preferred embodiment of my invention it will be understood that changes may be made in the details thereof without departing from the scope comprehended by the following claim.

I claim:

A receptacle comprising a molded insulating composition body including a bottom and opposed pairs of upwardly outwardly tapering side walls, one pair of side walls being each formed with an outwardly and downwardly opening vertically extending indentation opening adjacent the bottom of the side wall having side edges converging upwardly toward each other and terminating in an arcuate upper terminal end adjacent the top of the side wall, said terminal end being formed with an undercut groove and the upper ends of said side edges being formed with undercut grooves merging with the undercut groove of said upper terminal end, the bottoms of said indentations being substantially flat and parallel to each other whereby the tapering side walls cause progressive thickening of the side edges of the indentations, and the undercut grooves tapering upwardly and converging less than the side edges whereby to cause the lateral extent of said undercut grooves progressively to decrease in a downward direction, and a bail having a bight and legs spaced apart a distance substantially equal to the distance between the upper extremities of the side walls and terminating at each end in inwardly turned opposed end portions, spaced apart a distance substantially equal to the distance between the bottoms of the indentations, and discs rotatably mounted on each end portion of a diameter substantially equal to the diameter of the undercut groove of said terminal end and the minimum distance between the uppermost portion of the undercut grooves of the side edges, each disc including on its inner face a yieldable concaved element, the thickness of each disc and its associated element being substantially equal to the depth of the groove whereby said discs may be frictionally wedged into said undercut grooves in said indentations.

References Cited in the file of this patent

UNITED STATES PATENTS 3,028,042     Gottsegen _____ Apr. 3, 1962

FOREIGN PATENTS 722,573     Great Britain _____ Jan. 26, 1955